Patented Apr. 16, 1946

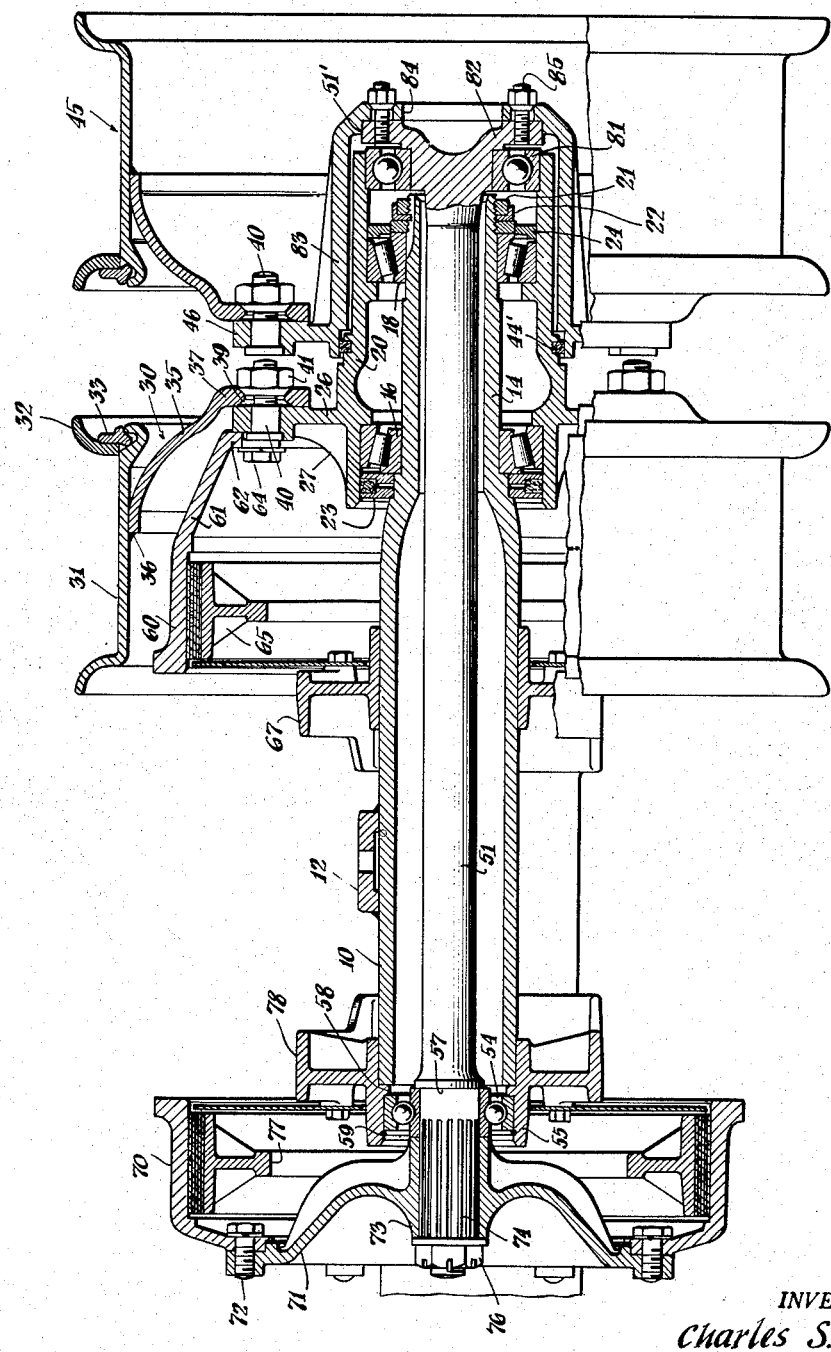

2,398,349

UNITED STATES PATENT OFFICE 2,398,349

DUAL WHEEL ASSEMBLY

Charles S. Ash, Milford, Mich.

Original application April 8, 1942, Serial No. 438,106, now Patent No. 2,367,748, dated January 23, 1945. Divided and this application July 1, 1944, Serial No. 543,115

13 Claims. (Cl. 301—36)

The present invention relates to new and useful improvements in dual wheel assemblies, and more particularly to new and useful improvements in dual wheels for use with semi-trailers and other non-driven dual wheels of road vehicles.

This application is a division of my copending application Serial No. 438,106 filed April 8, 1942, now matured into Patent No. 2,367,748, issued January 23, 1945.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principle of the invention.

In the drawing the figure is a fragmentary longitudinal vertical section showing a typical and illustrative embodiment of the present invention.

The present invention has for its object the provision of a novel and improved dual wheel assembly particularly adapted for use with trailers, semi-trailers and other road vehicles. A further object of the invention is the provision of the novel and improved dual wheel assembly using demountable wheels of conventional form, and in which the braking force is applied to one of the wheels through an axle shaft, thereby permitting the provision of ample braking area, and at the same time separating the braking means for the two wheels. Still another object of the invention is the provision of a dual wheel assembly utilizing duplicate demountable wheels which are connected together for coaxial independent rotation, and in which the inner wheel may be demounted and remounted with a minimum of difficulty, and without requiring the removal of the outer wheel or rim from its hub.

In accordance with the illustrative embodiment of the invention, the dual wheel assembly includes an axle tube of moderate length on which is freely rotatable an elongated hub member to which the inner wheel is demountably attached. On the outer portion of the elongated hub is rotatably mounted a shorter hub member to which the outer wheel is demountably attached. The inner wheel and its hub are held against axial movement by means of its bearings, while the outer wheel and its hub are held against axial movement by means of an axle shaft which extends from the outer end of the axle tube, is rotatably mounted in antifriction bearings and is held against axial movement within the axle tube, and is detachably connected to the outer wheel hub. Thereby the outer wheel hub may be removed and replaced without disturbing the axle shaft. Suitable braking means are provided for the wheels and may comprise a brake drum mounted on the inner side of the inner wheel and rotatable therewith, and a second brake drum mounted at the inner end of the axle shaft and rotatable with the outer wheel, suitable brake shoes or other cooperating braking means being provided for each of the brake drums. The dual wheel and brake assembly is connected to the vehicle in any suitable way, as by springs directly connected to the axle tubes, or by mounting the axle tubes in a separate frame.

It will be understood that the foregoing general description and the following detailed description as well are exemplary and explanatory of the invention but are not restrictive thereof.

Referring now in detail to the illustrative embodiment of the invention as shown by the single figure of the drawing there is provided an axle tube 10 which extends from an outer side of the vehicle toward, but not to, the center of the vehicle and this axle tube is provided with a spring pad 12 on which may be secured a conventional leaf spring by which the axle tube 10 is secured to the vehicle. At its outer end the axle tube 10 is reduced in diameter, as at 14, and is provided with bearing seats on which the tapered roller bearings 16 and 18 are seated. An inner wheel hub 20 of generally tubular construction is mounted on the axle tube end 14 by means of the bearings 16 and 18, which not only provide for its rotation, but also hold the hub 20 against axial movement with reference to the axle tube. Bearings 16 and 18 are seated within the hub 20 in the usual manner, the outer bearing 18 being secured by means of nut 21 and lock washer 22 to the threaded end of the axle tube 10, and both bearings are sealed against dirt by means of the seals 23 and 24.

On its inner half, the inner wheel hub 20 is provided with a radially extending disk-like portion 26 formed integrally with the hub 20 and strengthened by means of the webs 27, and this disk-like portion is provided with suitable wheel mounting means by which the demountable wheel 30 and its permanently attached rim 31, may be mounted and held rigidly to the hub 20.

The inner wheel 30 is shown as of a conventional Budd demountable wheel type, and comprises the pneumatic tire support rim 31 having the usual removable flange 32 and locking ring 33 for securing the tire to the rim. To this rim is permanently attached the wheel portion comprising a deeply-dished member 35 which is securely welded to the circular portion of the rim, as at 36, while the radially inward portion of the dish 35 terminates in a flat disk-like member 37 which is circularly apertured to pass over the wheel hub, and is provided with a circular series of beveled holes 39 to receive the correspondingly arranged series of wheel mounting studs 40 and their nuts 41. The studs 40 and their nuts 41 are securely seated in the outer or peripheral edge of the disk portion 26, and in general may be similar to the disclosure of my copending application, Serial Number 418,118, filed November 7, 1941.

The outer wheel hub 83 comprises a generally cylindrical member extending approximately one-half the length of the inner wheel hub 20 and of a very slightly larger diameter than inner wheel hub extension 20 mounted for the free and independent rotation on the inner wheel hub 20. At its inner end, hub 83 is provided with a radially extending integral disk-like portion 46 which carries the wheel mounting studs 40 arranged in a circular series. The outer wheel 45 is preferably a duplicate of the inner wheel 30, and is demountably attached to the outer wheel hub in the same manner. A felt washer 44' is seated in an annular groove in the hub 20 and bears against the inner end of hub 83 to exclude dirt from the space between hubs 20 and 83.

Means are provided for holding the outer wheel hub 83 against axial movement, and for transmitting braking torque to the outer wheel. As embodied, the outer wheel hub 83 at its outer end is provided with an integral flange 84 extending radially inwardly and overlying the flanged end 82 of an axle shaft 51. Flange 82 has a circular periphery fitting the inner seat 51' of the hub end 84, and the flange 82 is provided with studs 85 which project through a circular series of registering holes so that the hub 83 and axle shaft 51 are restrained against independent rotation and axial movement by means of the nuts on the studs.

Axle shaft 51 extends through the axle tube 10, and at its inner end is shouldered to receive ball bearing 54, the outer race of which is seated in collar 55 of the inner end of the axle tube 10, thereby rotatably mounting shaft 51 in the axle tube 10 and holding the shaft 51 coaxial with reference to the hubs 20 and 83.

At its outer end, shaft 51 is spaced from the inner wheel hub 20 by means of ball bearing 81 which also provides for the rotation of hub 83 independently of hub 20, and holds the hubs and wheels in coaxial relation.

Axle shaft 51 extends through the axle tube 10, and at its inner end is shouldered to receive ball bearing 54, the outer race of which is seated in collar 55 of the inner end of the axle tube 10, thereby rotatably mounting shaft 51 in the axle tube 10 and holding the shaft 51 coaxial with reference to the hubs 20 and 83.

When it is desired to replace an inner tire, or to change the inner wheel 30 for any reason, this can easily be accomplished by removal of the nuts from studs 85, and with both wheels jacked up from the ground, the outer wheel 45 and its hub 83 may then be slid axially from the end of the inner wheel hub 20. With the outer wheel and hub removed the inner wheel mounting nuts 41 are accessible and may be removed thereby allowing removal of the inner wheel 30 and its tire with a minimum of time and trouble. The inner wheel 30 is remounted by reversing the steps recited above.

The outer wheel is, of course, demounted and remounted in the usual manner.

Separate braking means are provided for the two wheels. The inner wheel braking means comprises the cylindrical brake drum 60 which is mounted on the inner wheel mounting flange 26 by means of the slightly conical portion 61 which terminates in a centrally apertured disk portion 62, the parts 60, 61 and 62 preferably being integral. The disk portion 62 is apertured to receive the mounting screws 64 by which the brake drum is rigidly secured to the wheel mounting flange 26. The brake member 60, 61, 62 is preferably of such a size that it is substantially enclosed within the dish of the wheel and rim structure 30, 31 and is of a diameter to provide substantial clearance between the brake drum portion 60 and the rim 31. Cooperating with the brake drum 60 is conventional brake shoe mechanism 65 which is supported on brake anchor bracket 67 secured to the axle tube 10. Conventional means (not shown) may be provided for expanding the brake shoes 65 into frictional engagement with the brake drum 60.

Braking means for the outer wheel is mounted at the inner end of the axle tube 10, and is connected to the outer wheel through the axle shaft 51. As embodied there is provided a brake drum 70 which is rigidly fastened to a wheel-like member 71 by bolts 72. The hub portion 73 of the wheel-like member is splined to the inner end 74 of the axle shaft 51 and holds the inner race of ball bearing 54 tightly against the shoulder 57, and is held against accidental axial movement by means of the castelated nut 76. Ball bearing 54 is also held against movement with respect to the axle tube 10 by means of the shoulder 58, and the circular spring 59, this spring being seated in an interior annual groove at the inner end of the collar 55. Braking effort is applied to the drum 70 by means of the brake shoe mechanism 77 supported and held against rotation by means of the brake anchor 78 forming a portion of the collar 55. Suitable brake expansion means are also provided but are not shown and may be of conventional form.

In the operation of the embodiment shown two of the dual wheel assemblies are connected to the semi-trailer by conventional springs holding their axle shafts 51 in alignment, with the inner ends of the axle tubes 10, and the outer wheel brake mechanism 70, 71 adjacent each other so that the wheeled portions of the assemblies are at the sides of the vehicle. Each of the inner wheels 30 is free to rotate about its axle tube 10, and the various bearings hold the wheels 30 and 45 in coaxial relation not only with respect to each other, but also with respect to the axle tube 10 and axle shaft 51, thereby permitting relative rotation of each of the wheels with respect to each other, as well as with respect to the axle tube 10. The inner wheel 30 is held against axial movement with respect to the axle tube 10 by means of the bearing 16 and 18, while the outer wheel 45 is normally held against axial movement with respect to the tube 10 and inner wheel 30 by means of the axle shaft 51 to which it is rigidly connected by the studs 84 and their nuts.

As the brakes are applied, the retarding effort exerted on drum 60 is directly transferred to the flange 26 and thereby to the inner wheel 30. The braking effort applied to the outer wheel brake drum 70 is transferred through the splined shaft end 74, to the shaft 51, to the outer wheel hub 42 and outer wheel 45, thereby providing independent braking for each of the independently rotatable wheels.

In this embodiment the bearing 81 not only serves to maintain the axle shaft 51 concentric with the inner wheel hub 80 when the outer wheel hub 83 has been removed, but also relieves the axle shaft from all strain except that of the brake torque.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheeled assembly, the combination of a pair of independently rotatable wheels, mounted side by side at the end of an axle tube, the inner wheel having an elongated hub on which the outer wheel is rotatably mounted by its hub and from which it may be removed by axial movement, an axle shaft held against axial movement relative to the axle tube and extending beyond the outer end of the inner wheel hub, the outer wheel hub being flanged to abut the axle shaft end, means for interconnecting the outer wheel hub and axle shaft to hold the outer wheel against axial movement, and a bearing between the outer ends of the axle shaft and inner wheel hub to maintain them coaxial.

2. The dual wheeled assembly of claim 1 in which an anti-friction bearing is provided at the outer end of the inner wheel hub beyond the outer end of the axle tube and supporting the axle shaft.

3. The dual wheeled assembly of claim 1 in which a brake drum is carried by one flange, a shaft is connected at one end to the other hub and passes through the hubs, and first brake drum and a second brake drum connected to the other end of the shaft.

4. In combination, a tubular axle spindle having a reduced end, axially spaced tapered bearings mounted on said end, a shaft extending through said spindle having a flange collar secured to the end thereof externally of said spindle, a first wheel spider having an elongated hub portion mounted on said bearings and having the end thereof extending beyond said spindle, a bearing interposed between said extended end and said flange collar, a second spider mounted for independent rotation about said extended hub portion, and means rigidly securing said flange collar to the hub of said second spider.

5. The combination of claim 4 wherein one of said tapered bearings is located substantially in the mid-plane of said first spider, and the other tapered bearing is located substantially in the mid-plane of said second spider.

6. In an independently rotatable dual wheel assembly, a first wheel spider having an integral axially outwardly extending hub portion, a second wheel spider having its hub portion encircling and rotatably supported on said extended hub portion, axially spaced bearing means within said extended hub portion substantially in line with said spiders, and bearing means within the outer end of said extended hub portion for transmitting the load of said second spider thereto.

7. The assembly of claim 6 wherein said axially spaced bearing means comprises opposed tapered bearings and said last-named bearing means comprises a radial thrust anti-friction bearing.

8. In combination, a shaft provided at its end with a flange having a hub portion on the inner face thereof forming an annular bearing seat, a tubular spindle encircling said shaft out of contact therewith and terminating short of said hub portion, a wheel spider bolted to said flange, a second wheel spider having an axially extended hub portion encircling said spindle and extending to a point adjacent said flange within the hub of said first spider, bearing means on said seat and seating in the end of said extended hub portion, and axially spaced bearing means mounting said extended hub portion on said spindle.

9. An independently rotatable dual wheel assembly comprising a tubular axle spindle having a shaft extending therethrough, a first wheel rotatably mounted on said spindle and having an extended hub portion, a second wheel having a hub portion encircling said extended hub portion, means on said shaft coupling said second wheel thereto, and means for transferring the load of said second wheel through said coupling means to said extended hub portion.

10. In an independently rotatable dual wheel assembly, a tubular axle spindle, a first wheel spider having an axially extended hub portion extending beyond the end of said spindle, a second wheel spider having its hub portion encircling and rotatably supported on said extended hub portion, axially spaced bearing means between said spindle and said extended hub portion, bearing means in the end of said extended hub portion beyond the end of said spindle, and means for transferring the load of said second spider to said last-named bearing means.

11. The assembly of claim 10 wherein said load transferring means includes a flanged collar secured to said second spider hub portion and having a portion engaging in said last-named bearing means.

12. In combination, a tubular axle spindle, axially spaced bearings thereon, a wheel spider having an axially extended hub portion rotatably supported on said bearings and extending beyond the end of said spindle, a second wheel spider rotatable about the extended hub portion of said first spider, a bearing in the extending end of said extended hub portion, and means for transferring the load of said second spider to said last-named bearing.

13. In combination, a tubular axle spindle, axially spaced bearings thereon, a wheel spider having an axially extended hub portion rotatably supported on said bearings and extending beyond the end of said spindle, a second wheel spider rotatable about the extended hub portion of said first spider and bearing means for transferring the load of said second spider to the overhanging end of said extended hub portion.

CHARLES S. ASH.